Patented Dec. 4, 1934

1,982,794

UNITED STATES PATENT OFFICE 1,982,794

UREA-FORMALDEHYDE REACTION PRODUCT AND PROCESS OF PREPARING SAME

Melville C. Dearing, Palatine, Ill., assignor to Economy Fuse & Manufacturing Co., Chicago, Ill., a corporation of New York No Drawing. Application August 27, 1932, Serial No. 630,700

4 Claims. (Cl. 260—3)

This invention relates to reaction products of urea and formaldehyde and particularly those products which can be molded under combined heat and pressure to form infusible and insoluble, mechanically resistant objects.

This invention relates further to the process of producing the reaction products above referred to and also to the process of producing final moulded objects therefrom and to the final moulded objects themselves.

It is an object of this invention to provide a process which is productive of a reaction product of urea and formaldehyde existing in a powdered form adapted for moulding under heat and pressure to form final moulded objects.

It is a further object of this invention to provide, in addition to the aforementioned process, the additional steps of heating and moulding productive of the final moulded objects.

It is a further object of this invention to provide a urea-formaldehyde reaction product existing in a powdered form capable of producing new and different final moulded objects.

In order to assist in the understanding of the present invention, a brief discussion will now be given of certain prior developments in the art to which this invention relates.

It is known that when certain products produced by the reaction of urea and formaldehyde are largely diluted and treated with electrolytes, particularly alkaline or acid substances, a precipitate is formed, usually after boiling for some time which, after appropriate mechanical treatment, may be moulded under heat and pressure. The chemical reactions involved are assumed to be those which pertain peculiarly to substances exhibiting colloidal behavior and the precipitation of the urea products is assumed to be a flocculation process caused by electrolytes.

As is well known, the initial reaction products of urea and formaldehyde are soluble in water, provided the conditions of the reaction are held to quite definite limits. Three factors of prime importance are involved in producing a water soluble initial reaction product, which are: (1) hydrogen ion concentration which is conveniently designated in terms of pH, (2) ratio of urea to formaldehyde, and (3), which is in a sense the corollary of (2), the rate of addition of the urea to the formaldehyde.

The pH may be varied widely from the distinctly alkaline side to the distinctly acid side provided the ratio of urea to formaldehyde is also varied. However, if the ratio is fixed at 1 mol. of urea to 2 mols. of formaldehyde, the pH may not be appreciably less than 5. That is to say, the solution may not be substantially more acid than corresponds to a hydrogen ion concentration of $1 \times 10^{-5.0}$, unless the rate of addition of urea to the formaldehyde is so controlled that only a small amount of urea is added at a time and reaction of the small added portion is caused to take place before subsequent addition of urea. On the other hand, if the molecular ratio of urea to formaldehyde is of the order of 1 to 4, the acidity may be that which corresponds to a pH of 3 without precipitation of water insoluble substances. Too, if the pH is increased, that is, if the solution is made strongly acid so as to approximate a concentrated acid solution, the urea and formaldehyde may again be in the molecular ratio of 1 to 2 without separation of water insoluble substances because the water insoluble substances which tend to separate are soluble in strongly acid solutions.

It is thus seen how inextricably connected are the factors above outlined and how futile it is to attempt to define the conditions of urea-formaldehyde reactions in terms of any one of the above factors.

It has now been found as the result of numerous experiments that at a given pH and at a given molecular ratio of urea to formaldehyde that the real cause of the water solubility (so called) of the initial products is the presence of uncombined formaldehyde. That is to say, the initial reaction products of urea and formaldehyde are not strictly speaking entirely water soluble, but are soluble in water containing free formaldehyde. As above stated, they are also soluble in strongly acid solutions.

To simplify the discussion, reference will now be made to specific conditions of reaction. Thus, if urea and a commercial formaldehyde solution, the pH of which has been adjusted to 5, are brought together in a molecular ratio not greater than 1 to 2 under appropriate conditions of temperature, a thinly-fluid product is formed. The viscosity increases only slowly under conditions of heat treatment such that no water or formaldehyde escapes from the reaction chamber. If the solution be distilled, however, with the partial elimination of water and formaldehyde, the viscosity increases rapidly, and if too much water and formaldehyde are eliminated the product increases in viscosity to such an extent that a jel structure is developed. That is, the product loses its character as a liquid and takes on the aspect of a solid.

It is not clearly understood just how this change is made. It may be that due to elimination of water the molecules of the initial product are brought into closer special relationship and that due to electrical charges or residual valence effects union is effected whereby progressively larger molecules are formed. On the other hand, it may be that the change in viscosity is due mainly to the greater concentration of the solution. Probably both views are correct in part with the development of larger molecules playing the greater part.

These large molecules, however, are still soluble in not too dilute formaldehyde solutions. As is well known, the specific product obtained by the above described distillation carried to a point short of gelation smells strongly of formaldehyde. It is found that a new, not very viscous, solution may be formed by adding a limited amount of water to this product. Due to the presence of the considerable amounts of uncombined formaldehyde in the product, solution is easily effected.

If this product is again subjected to distillation more formaldehyde escapes. After obtaining a viscous product by distillation a third solution may be effected, distillation carried out and still more formaldehyde eliminated. I have found that if this viscous product obtained as the result of the third distillation be poured into a relatively large quantity of water, that instead of a solution being formed a precipitate is formed. In other words, the product in the main is no longer soluble in large volumes of water. On the other hand it is soluble in limited quantities of water.

It is believed, although the invention should not be so limited, that the case of this phenomenon is the lowering of the concentration of the formaldehyde. By the operations described, formaldehyde is progressively eliminated to such an extent that an insufficient quantity is present in the large volume of water to maintain solubility.

Other methods of treatment of the initial product which tend toward elimination of formaldehyde or the lowering of its concentration result in precipitation of these products upon dilution. For example, an initial product may be prepared from two molecular weights of 40% formaldehyde and one molecular weight of urea at any desired pH, preferably 5.0, and this solution subjected to steam distillation. It is preferable to add water at such a rate as to prevent any great diminution of the volume of the solution and thus prevent gelation or the development of such a viscosity as would interfere with the steam distillation. In spite of these additions of water a progressive increase in the viscosity of the solution occurs, the rate of increase being dependent on the initial ratio of urea to formaldehyde, and upon the acidity of the solution. It is desirable to stop the passage of the steam previous to gelation and to pour the product into a relatively large volume of water whereupon a water insoluble product separates. This product is usually of a fibrous nature but upon kneading or otherwise washing with fresh quantities of water it becomes amorphous.

If a urea product made by either of the above described processes is subjected to dialysis in a parchment tube or other container the walls of which comprise a semi-permeable membrane, a product somewhat resembling crepe rubber is obtained. This product becomes amorphous on repeated washing.

All of the products described may, after drying, be molded under heat and pressure to form hard, mechanically resistant objects. If a dispersion medium as for example water be present, the molded objects will be transparent.

Three methods have been described which may be used to so lower the formaldehyde concentration that the urea-formaldehyde reaction product becomes insoluble in water. Other methods may be used, and accordingly the invention is not limited to the methods of this disclosure which are given merely by way of example. It is believed that this is the first discovery of the fact that by reducing the uncombined formaldehyde content the urea, formaldehyde reaction products can be thrown out of solution by simple dilution with a quantity of water equal in volume, say, to the volume of the original solution. Ordinarily somewhat larger quantities of water are preferred as tending to give a precipitate more easily handled.

Nor is this invention to be limited to the method of preparing the initial product, nor to the ratio of formaldehyde to urea. Ordinarily it is preferable to use about two molecular weights of formaldehyde to one molecular weight of urea since these products contain less uncombined formaldehyde to be eliminated than if a larger ratio of formaldehyde to urea were used.

The exact concentration of uncombined formaldehyde which will permit the separation of the water-insoluble product by a reasonable amount of dilution cannot be defined at the present time, and therefore it may be simply stated that the uncombined formaldehyde in the initial product should be so low as to permit separation of a water-insoluble product upon addition of the solution to ten times its volume of water. In practice the concentration of formaldehyde is usually lowered below this point.

I claim:

1. The process of producing a moldable precipitate which comprises reacting as sole reactants, urea and formaldehyde in aqueous solution, in molecular ratio of substantially one to two, and then removing a substantial amount of formaldehyde so that the molecular ratio of urea to formaldehyde becomes greater than one to two, and then precipitating the urea-formaldehyde reaction product by dilution with water.

2. The process of producing a moldable precipitate which comprises reacting as sole reactants, urea and formaldehyde in aqueous solution, in molecular ratio of substantially one to two, and then removing a substantial amount of formaldehyde so that the molecular ratio of urea to formaldehyde becomes greater than one to two, and then precipitating the urea-formaldehyde reaction product by dilution with substantially an equal volume of water.

3. The process of producing a moldable precipitate which comprises reacting as sole reactants, urea and formaldehyde in aqueous solution, in molecular ratio of substantially one to two, and then removing a substantial amount of formaldehyde so that the molecular ratio of urea to formaldehyde becomes greater than one to two, and then removing additional formaldehyde until precipitation of the urea-formaldehyde reaction product occurs.

4. The process of producing a moldable precipitate which comprises reacting as sole reactants, urea and formaldehyde in aqueous solution, in molecular ratio of substantially one to two, and then removing a substantial amount of formaldehyde so that the molecular ratio of urea to formaldehyde becomes greater than one to two, and then removing additional formaldehyde by dialyzing the solution until precipitation of the urea-formaldehyde reaction product occurs.

MELVILLE C. DEARING.